T. P. York,
Churn Dasher.
No. 95,401. Patented Sep. 28, 1869.
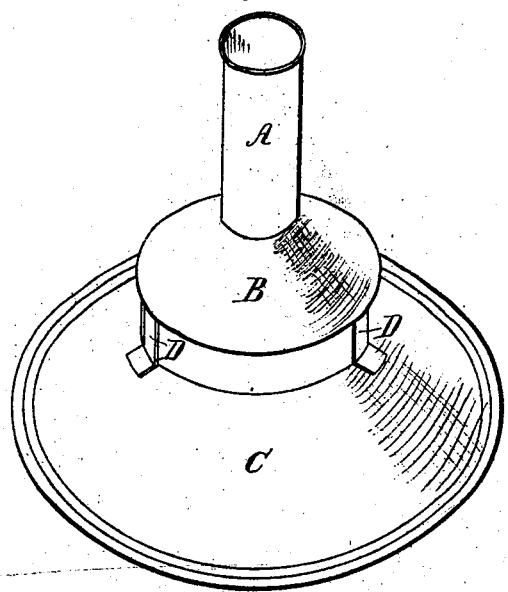
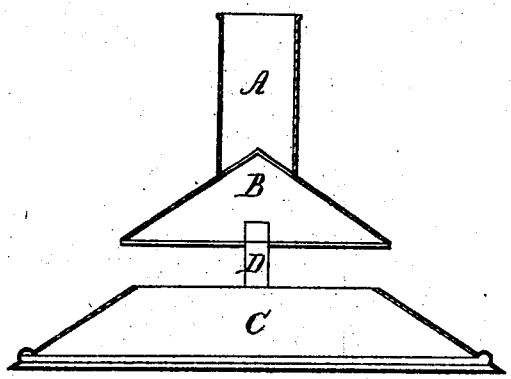
Witnesses
John R. Brewster
Andrew Gwines
Inventor
Travis P. York

United States Patent Office.

TRAVIS P. YORK, OF TERRE HAUTE, INDIANA.

Letters Patent No. 95,401, dated September 28, 1869.

IMPROVEMENT IN CHURN-DASHERS.

The Schedule referred to in these Letters Patent and making part of the same.

To all whom it may concern:

Be it known that I, TRAVIS P. YORK, of Terre Haute, in the county of Vigo, and in the State of Indiana, have invented certain new and useful Improvements in Churn-Dashers; and do hereby declare that the following is a full, clear, and exact description thereof, reference being had to the accompanying drawings, and to the letters of reference marked thereon, making a part of this specification.

The nature of my invention consists in the construction and arrangement of a churn-dasher, as will be hereinafter fully set forth.

In order to enable others skilled in the art to which my invention appertains, to make and use the same, I will now proceed to describe its construction and operation, referring to the annexed drawings, in which—

Figure 1 is a perspective view, and
Figure 2 is a vertical section.

This invention consists in a combination of two metallic coned or dished-shaped plates B and C.

C is the lower plate, and is open in the centre, the circumference at the top being smaller than the base.

The plate B is solid dish-plate inverted, the base of which is of equal circumference with that of the top of the plate C.

The plate B is placed directly over the upper open space of the plate C, by means of the three standards D D, leaving sufficient space between the two plates C and B for the egress of the cream, the plate C being of such a shape as to draw the cream up through the open space at the top, and against the solid plate B, and, when the dasher is forced down, the cream naturally passes out between the plates C and B, horizontally through the open space formed by the standards D D, and, at the same time, distributing the cream equally throughout the churn.

On top of the plate B is a socket, A, for the insertion of the handle.

Having thus fully described my invention,

What I claim as new, and desire to secure by Letters Patent, is—

The combination of the metallic conical-shaped open plate C with the solid metallic inverted dished-shaped plate B, placed directly on the open space of the top of the plate C, by means of the three standards D D, all arranged substantially as shown and described.

In testimony that I claim the foregoing, I have hereunto set my hand, this 26th day of July, 1869.

TRAVIS P. YORK.

Witnesses:
ANDREW GRIMES,
THOMAS CARROLL.